March 9, 1943.  H. F. BAKEWELL  2,313,312
TOOL HOLDER
Filed April 2, 1941
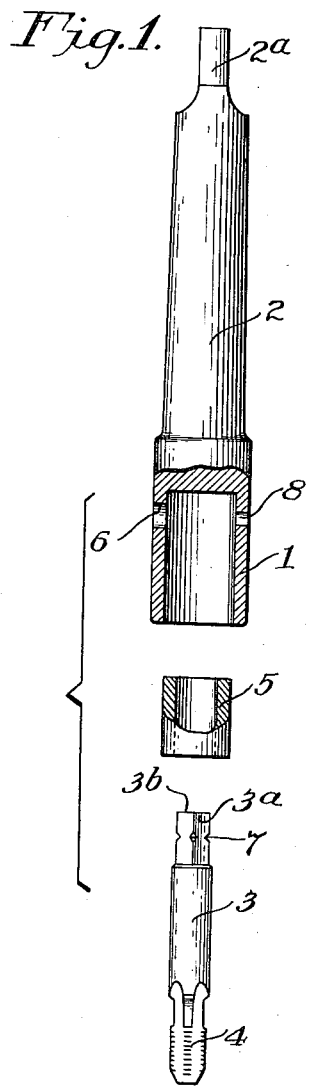
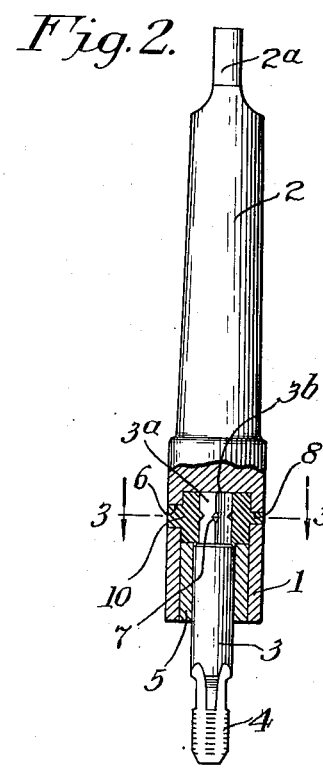
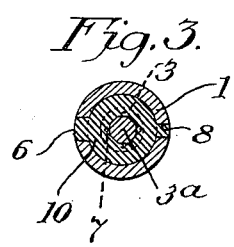
INVENTOR.
Harding F. Bakewell,
BY R. W. Smith Patented Mar. 9, 1943

2,313,312

UNITED STATES PATENT OFFICE 2,313,312

TOOLHOLDER

Harding F. Bakewell, San Marino, Calif.

Application April 2, 1941, Serial No. 386,485

6 Claims. (Cl. 287—119)

This invention is a tool holder, particularly applicable to a tool which functions by relative rotation of the tool and the work, e. g., a drill or a tap. It is an object of the invention to provide a holder of extremely simple and compact construction for readily interchangeable reception of different tools, with the tool accurately centered relative to the holder, and the tool holder preferably adapted for interchangeable reception of tools of different size.

It is a further object of the invention to accurately center and anchor interchangeable tools, employing a fusible metal alloy as the anchoring means.

More particularly, it is an object of the invention to provide a holder comprising a socket having a supporting shank and adapted for reception of a fusible metal alloy for anchoring the shank of a tool in the socket. The supporting shank is adapted for quick-detachable mounting in a machine tool, e. g. in a turret head, rotatable spindle, or the like; and the socket is adapted for reception of the shank of a tool, e. g. a drill or a tap, for accurately centering the tool and anchoring it against rotatable or axial displacement by means of the fusible alloy, without resorting to the usual bulky construction of a jaw-chuck or the like.

The invention is thus particularly applicable to precision tapping, since reduction in mass of the holder for the tap makes it possible to maintain extremely accurate feed for uniform thread-lead, and maintaining accurate centering of the tap insures true concentricity of the threading operation.

Further objects of the invention will be readily understood from the following description of the accompanying drawing, in which:

Fig. 1 is a side elevation, partly in axial section, of the tool holder and a tool, prior to operative assembly.

Fig. 2 is a similar view showing operative assembly.

Fig. 3 is a transverse section on the line 3—3 of Fig. 2.

The tool holder comprises a socket 1 having an axially projecting supporting shank 2. The shank 2 is adapted for quick-detachable mounting in a machine tool for relative rotation of the tool holder and the work, and in the illustrated embodiment is shown as a usual tapering shank having a non-circular end 2a, adapted for reception in and fixed against rotation relative to the rotary drive spindle (not shown) of a tapping machine. The socket 1, in cross-section, is slightly larger than the shank of the tool which is to be mounted therein, whereby for that range of tool sizes which are preferably adapted for mounting in the holder, the socket 1 need be of only slightly greater cross-section than its supporting shank 2. The holder is thus of reduced mass compared with a holder which is a jaw-chuck or the like, and which must be of appreciably greater diameter than its supporting shank in order to accommodate the jaws, etc.

The tool which is supported by the holder comprises a shank 3 adapted for reception of one end in the socket 1, with a tool element 4 at the projecting end of the shank. The tool element 4 may be of any type. Since the invention is particularly applicable to a tool which functions by relative rotation of the tool and the work, a tool element of this type is illustrated, e. g. a drill or a tap; and since the invention is of particular utility for precision tapping, the tool element 4 is shown as a usual tap. The shank of the tap or other tool is accurately centered in the socket 1, and for this purpose is preferably circular in cross-section; and the end of the shank 3 which is opposite the tool element 4 is preferably non-circular in cross section, to provide means for anchoring the tool against rotation relative to the tool holder. This anchoring end of the shank is shown at 3a, preferably square in cross-section.

Tools having shanks 3 of different diameter are preferably adapted for interchangeable, accurately centered reception in the socket 1. For this purpose, a bushing 5 is mounted in the socket and the shank of the tool is inserted in the bushing. The bore of the bushing conforms to the cross-section of the shank of the tool, i. e. in the illustrated embodiment the bore of the bushing is circular in cross-section, whereby the shank 3 of the tool is free for rotation in the bushing when first inserted therein.

Bushings are interchangeably employed, having bores of different diameter, whereby the shank of the tool of the particular size which it is desired to mount in the tool holder, is adapted for snug sliding and accurately centered reception in the bore of a corresponding bushing. The outer surfaces of the bushings which are thus interchangeably employed, are of common dimension and contour for snug sliding reception in the bore of the socket 1, e. g. in the illustrated embodiment the bore of the socket 1 is circular, and the outer surfaces of the interchangeable bushings are of circular cross-section and common diameter.

The bushing 5 is inserted in the socket 1 so that its outer end is substantially flush with the open end of the socket; and the bushing is of such length that when in this operative position its inner end is appreciably spaced from the inner end or base of the bore of the socket. The shank 3 of the tool is mounted in the bushing 5 so that its anchoring end 3a projects beyond the inner end of the bushing, with the end surface 3b of this anchoring end of the shank abutting or adjacent the base of the bore of the socket 1. When the tool is first mounted in the tool holder, an annular space is thus formed in the bore of the socket 1, between its base and the inner end of the bushing 5, and surrounding the anchoring end 3a of the tool shank.

A fusible metal alloy, shown at 10, is received in this annular space, for anchoring the tool against rotation or axial displacement while maintaining accurate centering of the tool in the socket 1. The tool is anchored against rotation by anchoring the fusible metal alloy against rotation in the socket 1, with the alloy surrounding and engaging the noncircular anchoring end 3a of the tool shank; and the tool is anchored against axial displacement by longitudinally anchoring the fusible metal alloy in the socket 1, with the alloy engaging the end 3a of the tool shank so as to anchor it against relative longitudinal displacement.

For this purpose, the socket 1 may be radially ported in transverse alinement with the annular space in which the fusible metal alloy is received, with the metal alloy anchored in this port which is shown at 6; and the anchoring end 3a of the tool shank is adapted for engagement by the surrounding metal alloy so as to anchor the tool against axial displacement in either direction, e. g. by providing shoulders on the anchoring end of the tool shank, preferably by notching the same as shown at 7. A vent port 8 is preferably provided in the wall of the socket 1, diametrically opposite the port 6.

When the bushing 5 has been inserted in the socket 1, with the tool shank operatively mounted in the bushing, a sufficient quantity of the fusible metal alloy is melted and poured via port 6, so that upon solidification it fills the ports 6—8 and the annular space surrounding the anchoring end 3a of the tool shank, thereby anchoring the accurately centered tool in its holder. To change the tool, the metal alloy which is anchoring the same is remelted and drained off via ports 6—8, so that the tool may be readily removed and a different tool inserted and anchored in the holder by again pouring the molten metal and permitting it to solidify. When thus changing tools, the bushing 5 may also be changed, the bushing which is employed having a bore of diameter accurately centering the tool shank of the particular size of tool which is to be mounted in the holder.

The metal alloy has a relatively low melting temperature, i. e. at temperature to which the tool holder and its tool are subjected during normal use of the tool the metal alloy contains in its solid phase, but at increased temperature, less than that which will in any way injure the tool holder or its tool and such as may be readily obtained by simple equipment, e. g. a torch, burner or small electric heater, the metal alloy melts and may be poured.

The metal alloy is also an alloy which upon solidification is of sufficient hardness and strength to prevent wear or distortion as a result of the torsional or axial stress to which the tool (which is anchored in the holder) is subjected during use.

Furthermore, the metal alloy is preferably one which expands slightly upon solidification. The tool having been initially accurately centered by its snug sliding reception in its cooperating bushing 5, is thus maintained accurately centered when the metal alloy has been poured around its anchoring end 3a and has solidified, since the metal is equally distributed around the anchoring end 3a and as a result of its slight expansion maintains uniformly distributed centripetal pressure insuring accurate centering of the tool.

As an instance of a metal alloy having the desired characteristics, an alloy of bismuth, lead, tin and antimony, of the type which is manufactured and sold under the trade-mark "Cerromatrix," may be advantageously employed. This alloy has a melting temperature of 248° F. and a pouring temperature of 300° to 400° F. It expands (as a result of solidification, cooling and aging) approximately .002" per in., and its Brinell hardness is 19.

The invention thus provides a convenient and compact holder for a tool, with the particular size of tool which is to be mounted in the holder accurately centered therein by employing a bushing 5 of corresponding bore. The accurately centered tool is readily anchored in the holder by pouring the molten metal alloy and permitting it to solidify; and by remelting and draining off the molten metal the tool may be readily removed from the holder for interchanging different tools.

I claim:

1. In combination, a socket having a supporting shank, a bushing having a circular bore and closely fitting the bore of the socket in spaced relation from the base of the same, and a tool having a shank terminating in an anchoring end which is non-circular in cross-section, the tool shank being in rotatable snug sliding engagement with the bore of the bushing with its anchoring end projecting into the bore of the socket beyond the inner end of the bushing, the anchoring end of the tool shank having shoulders adapted for engagement for anchoring the tool shank against axial displacement, the socket having a transverse port for supplying molten metal to that portion of the bore of the socket which surrounds the anchoring end of the tool shank so that upon solidification the metal fills said port and said portion of the bore of the socket and surrounds and engages the anchoring end of the tool shank and its shoulders, and said metal being a relatively low melting metal alloy which expands slightly upon solidification.

2. In combination, a socket having supporting means, a bushing closely fitting the bore of the socket in spaced relation from the base of the same, and a tool having a shank terminating in an anchoring end and in snug sliding engagement with the bore of the bushing with its anchoring end projecting into the bore of the socket beyond the inner end of the bushing, the socket having a passageway for supplying molten metal to that portion of the bore of the socket which surrounds the anchoring end of the tool shank so that upon solidification the metal fills said portion of the bore of the socket and surrounds and engages the anchoring end of the tool shank.

3. In combination, a socket having supporting means, a bushing closely fitting the bore of the socket in spaced relation from the base of the same, and a tool having a shank terminating in an anchoring end and in snug sliding engagement with the bore of the bushing with its anchoring end projecting into the bore of the socket beyond the inner end of the bushing, the socket having a passageway for supplying molten metal to that portion of the bore of the socket which surrounds the anchoring end of the tool shank so that upon solidification the metal fills said portion of the bore of the socket and surrounds and engages the anchoring end of the tool shank, and the anchoring end of the tool shank having abutment means engaged by the solidified metal for anchoring the tool shank against rotation or axial displacement.

4. In combination, a socket having supporting means, a bushing closely fitting the bore of the socket in spaced relation from the base of the same, and a tool having a shank terminating in an anchoring end and in snug sliding engagement with the bore of the bushing with its anchoring end projecting into the bore of the socket beyond the inner end of the bushing, the socket having a passageway for supplying molten metal to that portion of the bore of the socket which surrounds the anchoring end of the tool shank so that upon solidification the metal fills said portion of the bore of the socket and surrounds and engages the anchoring end of the tool shank, the anchoring end of the tool shank having abutment means engaged by the solidified metal for anchoring the tool shank against rotation or axial displacement, and said metal being a relatively low melting metal alloy which expands slightly upon solidification.

5. In combination, a socket having supporting means, a bushing closely fitting the bore of the socket in spaced relation from the base of the same, and a tool having a shank terminating in an anchoring end which is non-circular in cross-section, the tool shank being in snug sliding engagement with the bore of the bushing with its anchoring end projecting into the bore of the socket beyond the inner end of the bushing, the anchoring end of the tool shank having shoulders adapted for engagement for anchoring the tool shank against axial displacement, the socket having a transverse port for supplying molten metal to that portion of the bore of the socket which surrounds the anchoring end of the tool shank so that upon solidification the metal fills said port and said portion of the bore of the socket and surrounds and engages the anchoring end of the tool shank and its shoulders.

6. In combination, a socket having supporting means, a bushing closely fitting the bore of the socket in spaced relation from the base of the same, and a tool having a shank terminating in an anchoring end which is non-circular in cross-section, the tool shank being in snug sliding engagement with the bore of the bushing with its anchoring end projecting into the bore of the socket beyond the inner end of the bushing, the anchoring end of the tool shank having shoulders adapted for engagement for anchoring the tool shank against axial displacement, the socket having a transverse port for supplying molten metal to that portion of the bore of the socket which surrounds the anchoring end of the tool shank so that upon solidification the metal fills said port and said portion of the bore of the socket and surrounds and engages the anchoring end of the tool shank and its shoulders, and said metal being a relatively low melting metal alloy which expands slightly upon solidification.

HARDING F. BAKEWELL.